(12) United States Patent
Fujita et al.

(10) Patent No.: US 7,903,875 B2
(45) Date of Patent: Mar. 8, 2011

(54) CHARACTER RECOGNITION PROCESSING DEVICE, CHARACTER RECOGNITION PROCESSING METHOD, AND MOBILE TERMINAL DEVICE

(75) Inventors: Yukihiro Fujita, Sagamihara (JP); Kouji Sawamura, Yokohama (JP); Katsuyuki Ito, Yokohama (JP)

(73) Assignee: Panasonic Corporation, Osaka (JP)

( * ) Notice: Subject to any disclaimer, the term of this patent is extended or adjusted under 35 U.S.C. 154(b) by 1022 days.

(21) Appl. No.: 10/523,877

(22) PCT Filed: Jul. 25, 2003

(86) PCT No.: PCT/JP03/09483
§ 371 (c)(1),
(2), (4) Date: Feb. 7, 2005

(87) PCT Pub. No.: WO2004/015619
PCT Pub. Date: Feb. 19, 2004

(65) Prior Publication Data
US 2006/0177135 A1    Aug. 10, 2006

(30) Foreign Application Priority Data

Aug. 7, 2002 (JP) ................. 2002-230312
May 12, 2003 (JP) ................. 2003-133171

(51) Int. Cl.
*G06K 9/34* (2006.01)
*G06K 9/20* (2006.01)
(52) U.S. Cl. ........................ 382/175; 382/321
(58) Field of Classification Search .............. 382/175, 382/282, 321, 323
See application file for complete search history.

(56) References Cited

U.S. PATENT DOCUMENTS
5,517,586 A * 5/1996 Knowlton .................. 382/292
(Continued)

FOREIGN PATENT DOCUMENTS
JP    7-220025    8/1995
(Continued)

OTHER PUBLICATIONS
European Search Report dated Sep. 5, 2007.
(Continued)

*Primary Examiner* — Brian Q Le
(74) *Attorney, Agent, or Firm* — Pearne & Gordon LLP

(57) ABSTRACT

It is an object of the present invention to improve a rate of recognition and recognition speed, reduce a degree of a specification required for a device forming a photographing device or a system and lower consumed electric power and a cost. In a character recognition processing method according to the present invention, a character image as an object whose character is to be recognized is displayed on a display (12) together with a cursor of a character frame for recognizing a character. While the cursor is set to a character string as an object to be recognized, the character image is photographed by a photographing part (9). In an image fetching part (3), the image data of the photographed character image is fetched. In a layout analyzing part (5), the fetched image data of the character image and cursor position information from a cursor control part (4) corresponding to the character image are received. The image data is collated with the cursor position information to analyze the arrangement of the lines or characters of the character string as the object to be recognized. Then, in a character cutting part (6), the character is cut on the basis of the analyzed result. The character is recognized relative to the character image by a character recognizing part (7) to convert the image data to character data.

19 Claims, 11 Drawing Sheets

U.S. PATENT DOCUMENTS

| | | | |
|---|---|---|---|
| 6,178,270 B1 * | 1/2001 | Taylor et al. | 382/284 |
| 6,473,523 B1 * | 10/2002 | Newman et al. | 382/176 |
| 7,188,307 B2 * | 3/2007 | Ohsawa | 715/205 |
| 2001/0032070 A1 | 10/2001 | Teicher | |
| 2002/0012468 A1 | 1/2002 | Togshi et al. | |
| 2002/0051575 A1 * | 5/2002 | Myers et al. | 382/202 |
| 2002/0131636 A1 * | 9/2002 | Hou | 382/181 |
| 2003/0169923 A1 * | 9/2003 | Butterworth | 382/181 |

FOREIGN PATENT DOCUMENTS

| | | |
|---|---|---|
| JP | 9-62786 | 3/1997 |
| JP | 10-069524 A | 3/1998 |
| JP | 2000-023012 A | 1/2000 |
| JP | 2000-76378 | 3/2000 |
| JP | 2000-207487 A | 7/2000 |
| JP | 2000-330681 | 11/2000 |
| JP | 2001-8072 | 1/2001 |
| JP | 2001-60250 | 3/2001 |
| JP | 2002-24762 | 1/2002 |
| JP | 2002-111841 | 4/2002 |
| JP | 2003-78640 | 3/2003 |
| WO | 0225575 | 3/2002 |

OTHER PUBLICATIONS

Japanese Office Action dated Apr. 9, 2010.

* cited by examiner

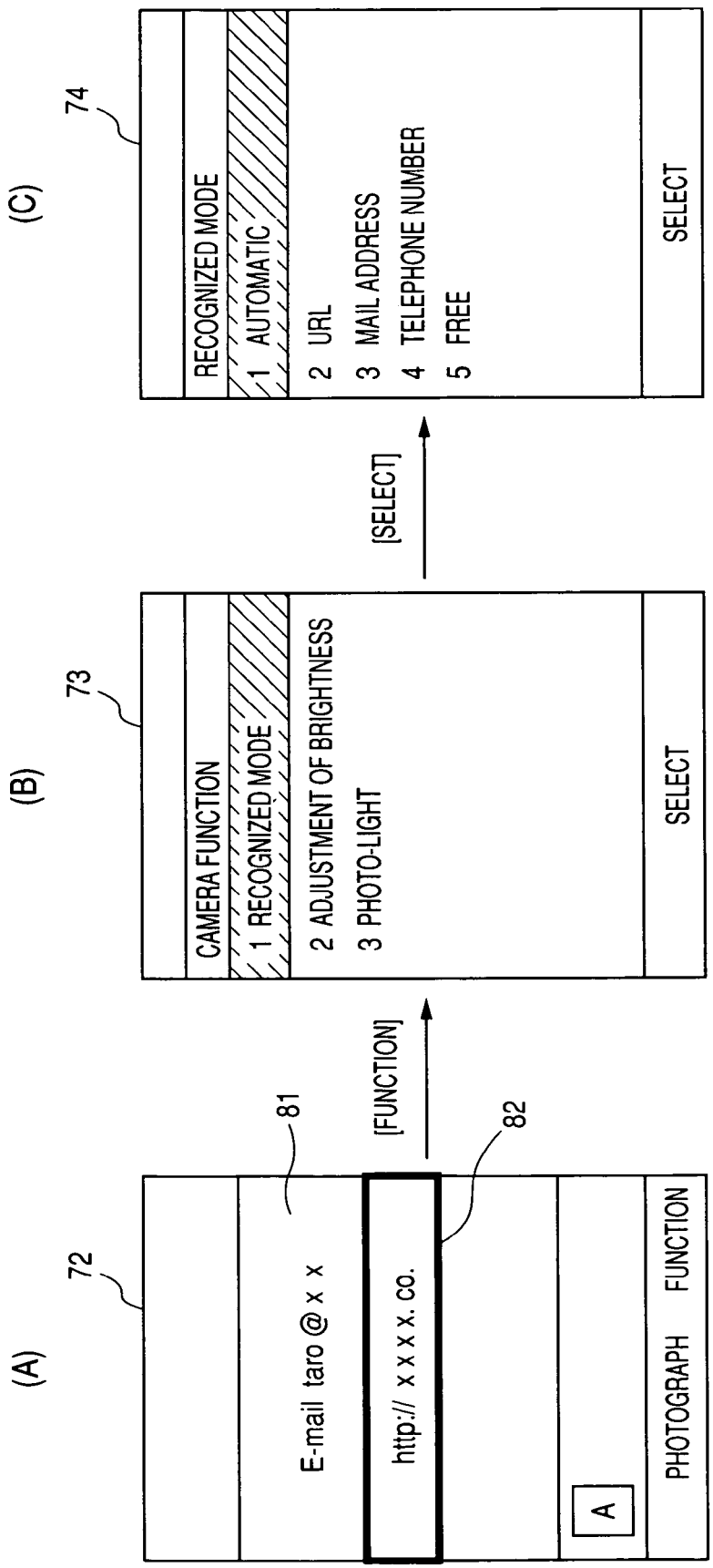

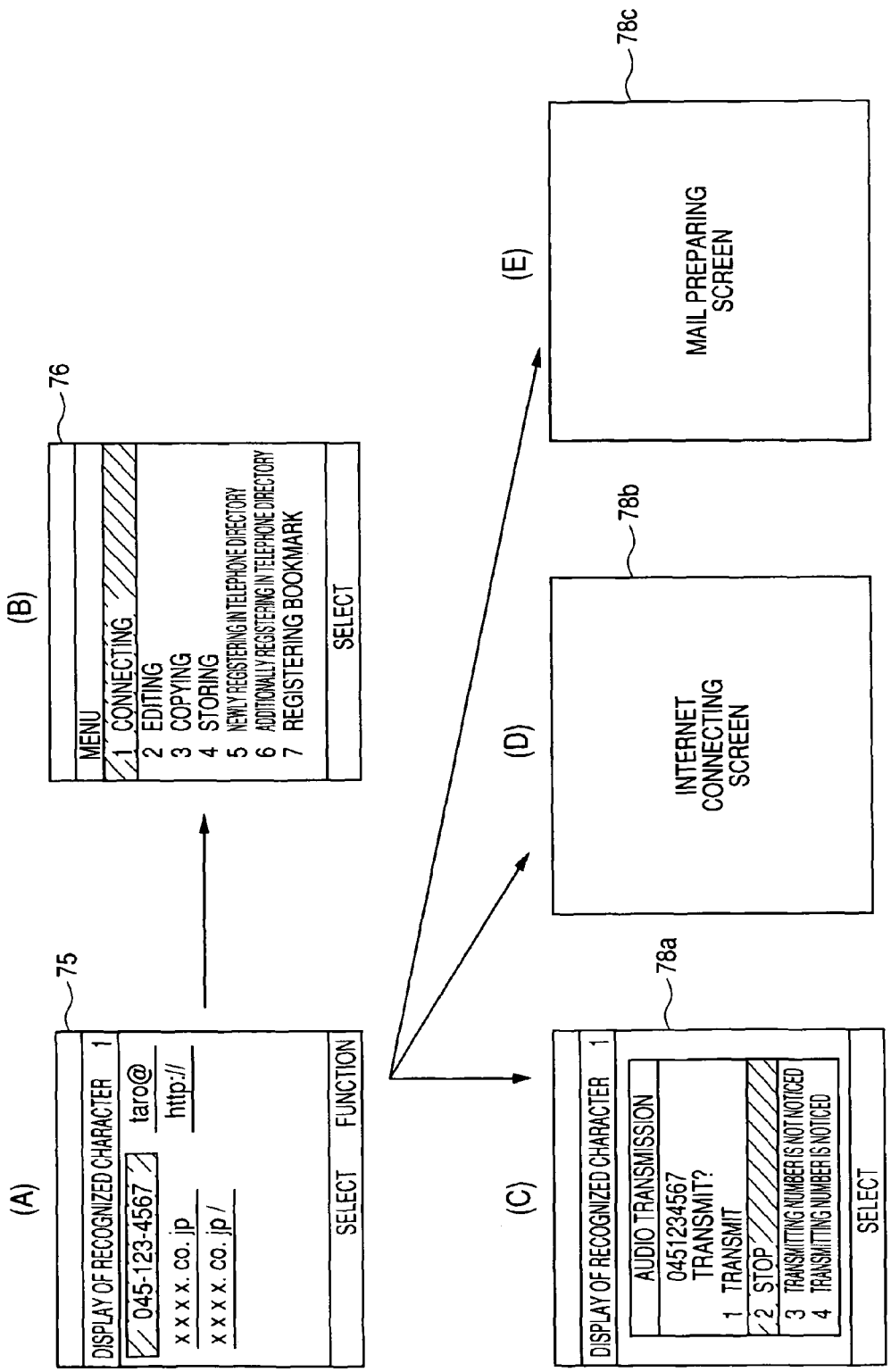

CHARACTER RECOGNITION PROCESSING DEVICE, CHARACTER RECOGNITION PROCESSING METHOD, AND MOBILE TERMINAL DEVICE

TECHNICAL FIELD

The present invention relates to a character recognition processing device, a character recognition processing method and a portable terminal device that are preferably used for a portable terminal device such as a portable telephone, a portable information terminal or the like.

BACKGROUND ART

As a usual character recognizing method and a usual character recognizing device, a character recognizing method and a character recognizing device that are disclosed in, for instance, JP-A-2001-60250 (Patent document 1) and JP-A-2000-76378 (Patent document 2) have been known.

In the character recognizing method and the character recognizing device disclosed in JP-A-2001-60250, a feature amount is extracted from a character whose image is inputted and the character is recognized on the basis of the extracted feature amount. In this example, every time the character whose image is inputted is scanned at prescribed intervals, the number of times of the intersections of scanning lines and the character are obtained. Further, the sum total of the differences of the obtained number of times of the intersections between the respective adjacent scanning lines is obtained as one of the feature amount to recognize the character. Scanning operations relative to the character to be recognized are carried out at prescribed intervals in at least two different directions or carried out at prescribed intervals in two directions intersecting at right angles with each other.

On the other hand, in the character recognizing method disclosed in JP-A-2000-76378, the outline data of inputted image data is formed. Data obtained by normalizing the formed outline data is collated with dictionary data formed by extracting the outline data of a previously registered standard character to recognize a character. At this time, depending on the typeface or the distortion of the inputted image data, the outline data of the image data is deformed to a typeface that can be recognized by the dictionary data or deformed so that the distortion is corrected before the data is collated with the dictionary data.
[Patent Document]
JP-A-2001-60250
[Patent Document 2]
JP-A-2000-76378

However, in the usual character recognizing method and the character recognizing device, when the character is recognized from fetched character image data, a special process has needed to be carried out by using scanning lines or outline data respectively in the analysis of a layout or the cutting operations of lines and the character to improve a rate of recognition or recognition speed.

Further, ordinarily, when a character string whose characters are to be recognized is entirely photographed at a time, the number of pixels of a photographing device (for instance, a CCD camera or the like) needs to be increased to ensure a resolution for one character and large-scale data of a necessary value or more is treated. Thus, a host CPU or a MIPS (Million Instructions Per Second) value of a DSP or a work RAM undesirably needs to be increased.

The present invention is devised by considering the above-described circumstances and an object of the present invention is to provide a character recognition processing device, a character recognition processing method and a portable terminal device that can improve a rate of recognition and a recognition speed, can reduce the degree of a specification required for a device forming a photographing device or a system and can decrease consumed electric power and a cost.

DISCLOSURE OF THE INVENTION

A character recognition processing device according to the present invention comprises an image fetching unit for fetching the image data of a character image as an object to be recognized that is photographed for recognizing a character; a cursor information output unit for outputting cursor position information showing the position of a character frame for recognizing the character coordinated with the character image; a layout analyzing unit for collating the cursor position information with the fetched image data of the character image to analyze the arrangement of the character; a character cutting unit for extracting the character image on the basis of the analyzed result of the layout analyzing unit; and a character recognizing unit for recognizing the extracted character image as the character and converting the character image to character information.

According to the above-described structure, when the character of the object whose character is to be recognized is recognized, the character image as the object to be recognized is displayed on a display part formed with a liquid crystal display element together with the character frame for recognizing the character. While a cursor of the character frame for recognizing the character is set to a character string as an object to be recognized, the character image is photographed by an image pick-up part such as a CCD camera. Then, the image data of the character image is fetched by the image fetching unit. The cursor position information is collated with the fetched image data of the character image by the layout analyzing unit to analyze the arrangement of lines or characters. The character is extracted and recognized relative to the character image by the character cutting unit and the character recognizing unit. Accordingly, in the layout analyzing unit, the arrangement information of the lines or the characters of the character string as the object to be recognized can be precisely analyzed by using the cursor position information. As a result, a rate of recognition and a recognition speed can be improved. Further, even when the number of pixels of the image data for recognizing the character is not increased, the character can be highly accurately recognized by using the cursor position information. Accordingly, a specification of high performance that a photographing part has many pixels is not required and a specification required for the device can be reduced. Further, the throughput of the data in the device can be reduced, so that a specification necessary for a device forming a system such as a CPU, a DSP, a memory or the like can be reduced. Thus, the degree of the specification of each of parts of the device can be reduced, so that a consumed electric power and a cost can be lowered.

Further, in the above-described structure, when the character image as the object to be recognized is composed of a plurality of character images obtained by a continuous photographing operation, the image fetching unit fetches the image data of the character images respectively for prescribed areas from all of the character images. The layout analyzing unit collates the cursor position information with each of the fetched image data of the plurality of character images to analyze the arrangement of the characters.

In the above-described structure, when the entire part of the character image cannot be photographed at a time by a photographing operation, for instance, when the character string as the object whose characters are to be recognized is large, while the photographing part is moved, a continuous photographing operation is carried out to photograph the character image. In the obtained image data of the character image, the image data of the character image is fetched respectively for prescribed areas from the entire part of the character image by the image fetching unit. The cursor position information is collated with each of the fetched image data of the plurality of character images by the layout analyzing unit to analyze the arrangement of the lines or the characters. As described above, the character image is divided into still images of some frames and the still images are fetched together with the cursor position information. Consequently, even when the character string as the object to be recognized is long, the arrangement information of the character string as the object to be recognized can be precisely analyzed by employing the cursor position information in the layout analyzing unit.

Further, in the above-described structure, when the character image as the object to be recognized is composed of a plurality of character images obtained by a continuous photographing operation, the image fetching unit fetches the image data of the character images respectively for prescribed areas from all of the character images. The layout analyzing unit collates the cursor position information with the image data in which the plurality of fetched character images are connected together to analyze the arrangement of the characters.

In the above-described structure, when the entire part of the character image cannot be photographed at a time by a photographing operation, for instance, when the character string as the object whose characters are to be recognized is large, while the photographing part is moved, a continuous photographing operation is carried out to photograph the character image. In the obtained image data of the character image, the image data of the character image is fetched respectively for prescribed areas from the entire part of the character image by the image fetching unit. After the fetched image data of the plurality of character images is temporarily connected to one image, the image data is collated with the cursor image information to analyze the arrangement of lines or characters by the layout analyzing unit. As described above, the character image is divided into still images of some frames and the still images are fetched together with the cursor position information. Consequently, even when the character string as the object to be recognized is long, the arrangement information of the character string as the object to be recognized can be precisely analyzed by employing the cursor position information in the layout analyzing unit.

Further, the present invention provides a portable terminal device having the character recognition processing device as described above.

According to the above-described structure, in the portable terminal device on which the character recognition processing device is mounted, while a rate of recognizing and a recognition speed for recognizing a character is improved, a specification required for a device forming a system such as a photographing part, a CPU, a DSP, a memory or the like can be reduced. Thus, the degree of the specification of each of parts of the device can be reduced and a low consumed electric power and a low cost can be realized.

A portable terminal device according to the present invention comprises a photographing unit for photographing a character image as an object to be recognized for recognizing a character; an image fetching unit for fetching the image data of the photographed character image; a cursor information output unit for outputting cursor position information showing the position of a character frame for recognizing the character coordinated with the character image; a layout analyzing unit for collating the cursor position information with the fetched image data of the character image to analyze the arrangement of the character; a character cutting unit for extracting the character image on the basis of the analyzed result of the layout analyzing unit; and a character recognizing unit for recognizing the extracted character image as the character and converting the character image to character information.

According to the above-described structure, the layout of the character corresponding to the character frame for recognizing the character is analyzed on the basis of the image data of the character image and the cursor position information showing the position of the character frame for recognizing the character to recognize the character. Thus, while a rate of recognizing and a recognition speed for recognizing the character is improved, a specification required for a device forming a system such as a photographing part, a CPU, a DSP, a memory or the like can be reduced. Accordingly, the degree of the specification of each of parts of the device can be reduced and a low consumed electric power and a low cost can be realized.

Further, in the above-described structure, a character frame display unit is further provided for displaying the character frame for recognizing the character overlapped on the character image upon photographing by the photographing unit.

According to this structure, while a user sees the displayed character frame for recognizing the character, the user can easily photograph the character as the object to be recognized to the character frame for recognizing the character to recognize the character.

In any of the above-described structures, a recognized character display unit is further provided for displaying the character information as a recognized result by the character recognizing unit.

According to this structure, the user can easily recognize the character information of the recognized result by a display.

Further, in the above-described structure, the recognized character display unit individually selectively displays the character information as the recognized result for each of prescribed character units.

According to this structure, the user can individually select and utilize the recognized character information for each unit such as the types of the characters on the basis of the displayed character information.

Further, in any of the above-described structures, a recognized character storing unit is further provided for storing the character information as the recognized result by the character recognizing unit.

According to this structure, the user can store and utilize the recognized character information in a desired form.

Further, in the above-described structure, the recognized character storing unit stores the character information in a recognized character storing area.

According to this structure, for instance, the character information of a plurality of recognized results can be stored in the recognized character storing area and used.

Further, in the above-described structure, the recognized character storing unit registers the character information in a data base corresponding to a type of each character information when the type of the character information is any of a telephone number, a mail address, a URL (Uniform Resource Location).

According to this structure, when the character of the telephone number, the mail address, the URL or the like is recognized, the character information can be registered in the data base such as a telephone directory or a book mark depending on the type of the character information and utilized.

In any of the above-described structures, a recognized character utilizing unit is further provided for utilizing the character information as the recognized result by the character recognizing unit in accordance with the type of the character information.

According to this structure, the user can effectively employ the character information for each of the types such as the telephone number, the mail address, the URL or the like in accordance with the type of the recognized character information.

Further, in the above-described structure, when the type of the character information is the telephone number, the recognized character utilizing unit displays a transmitting screen to the telephone number.

According to this structure, when the recognized character information is the telephone number, the transmitting screen to the telephone number is displayed so that the user can simply carry out a transmitting operation.

In the above-described structure, when the type of the character information is the mail address, the recognized character utilizing unit displays an electronic mail preparing screen to the mail address.

According to this structure, when the recognized character information is the mail address, the electronic mail preparing screen to the mail address is displayed so that the user can simply prepare and transmit an electronic mail.

Further, in the above-described structure, when the type of the character information is the URL (Uniform Resource Locator), the recognized character utilizing unit displays a network connecting screen to the URL.

According to this structure, when the recognized character information is the URL, the network connecting screen to the URL is displayed so that the user can simply carry out a connecting operation to a network such as the internet to obtain desired information.

Further, in any of the above-described structures, the photographing unit has a function for continuously photographing the character image as the object to be recognized. When a plurality of the character images as the objects to be recognized is obtained by the photographing unit, the image fetching unit fetches the image data of the plurality of character images that are connected together. The character recognizing unit recognizes the characters of the image data of the connected character images to convert the image data to the character information.

According to this structure, when the character string as the object to be recognized is not put in a photographing range at a time, the character images are continuously photographed by coordinating the character images with the character frame for recognizing the character and the plurality of the character images thus obtained is connected together. Thus, even when the character string is long, a rate of recognition and a recognition speed for recognizing the character can be improved.

In any of the above-described structures, the photographing unit has a function for continuously photographing the character image as the object to be recognized. When a plurality of the character images as the objects to be recognized is obtained by the photographing unit, the image fetching unit fetches the image data of the plurality of character images. The character recognizing unit recognizes the characters of the fetched image data respectively for the plurality of character images to convert the image data to the character information.

According to this structure, when the character string as the object to be recognized is not put in a photographing range at a time, the character images are continuously photographed by coordinating the character images with the character frame for recognizing the character. The characters of the image data are recognized respectively for the plurality of character images thus obtained. Thus, even when the character string is long, a rate of recognition and a recognition speed for recognizing the character can be improved.

Further, in any of the above-described structures, the character recognizing unit has a plurality of recognizing modes that meet the types of the characters as the objects to be recognized and carries out a character recognizing process suitable for the corresponding type of the character in accordance with a preset recognizing mode.

According to this structure, the user sets the recognizing mode corresponding to the type of the character that is to be recognized by the user. Thus, the character recognizing process suitable for the corresponding type of the character can be carried out to improve the rate of recognition.

A character recognition processing method according to the present invention comprises: a step of displaying and photographing a character image as an object to be recognized together with a character frame for recognizing a character; a step of fetching the image data of the photographed character image; a step of outputting cursor position information showing the position of the character frame for recognizing the character coordinated with the character image; a step of collating the cursor position information with the fetched image data of the character image to analyze the arrangement of the character; a step of extracting the character image on the basis of the analyzed result of the arrangement of the character; and a step of recognizing the extracted character image as the character and converting the character image to character information.

According to this method, the arrangement information of lines or characters of a character string as an object to be recognized can be precisely analyzed by using the cursor position information to improve a rate of recognition or a recognition speed. Further, the cursor position information is used so that a specification required for each part of the device can be reduced. Since the throughput of the data in the device can be reduced, the degree of a specification of the device can be reduced and a low consumed electric power and a low cost can be realized.

Further, the present invention provides a character recognition processing program in which the above-described steps are respectively executed by a computer.

According to this program, the layout of the character corresponding to the character frame for recognizing the character can be precisely analyzed on the basis of the image data of the character image and the cursor position information showing the position of the character frame for recognizing the character to recognize the character. While the rate of recognition and the recognition speed for recognizing the character are improved, the degree of the specification of each part of the device can be reduced and a low consumed electric power and a low cost can be realized.

BRIEF DESCRIPTION OF THE DRAWINGS

FIG. 12 shows one example of each screen of the OCR function in the third embodiment, FIG. 12(A) showing a preview display screen, FIG. 12(B) showing a camera function setting screen and FIG. 12(C) showing a recognizing mode setting screen, respectively; and FIG. 13 shows one example of each screen of the OCR function in the third embodiment, FIG. 13(A) showing a recognized character display screen, FIG. 13(B) showing a function menu display screen, FIG. 13(C) showing an audio transmitting screen, FIG. 13(D) showing an internet connecting screen and Fig, and 13(E) showing a mail preparing screen, respectively.

Figure 1:
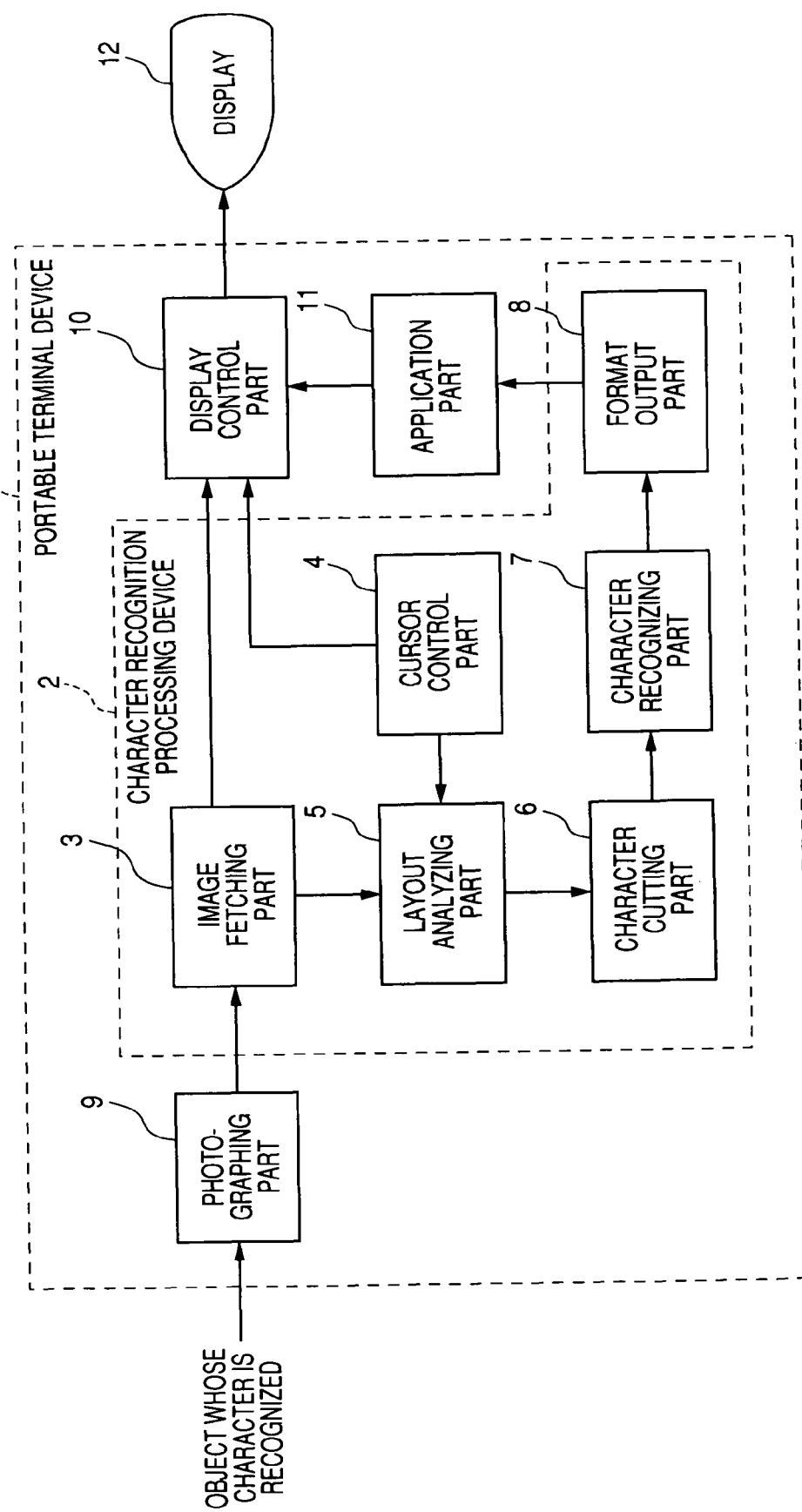
FIG. 1 is a block diagram showing the structure of a portable terminal device having a character recognition processing device according to a first embodiment of the present invention.

In the drawings, reference numeral 1 designates a portable terminal device. 2 designates a character recognition processing device. 3 designates an image fetching part. 4 designates a cursor control part. 5 designates a layout analyzing part. 6 designates a character cutting part. 7 designates a character recognizing part. 8 designates a format output part. 9 designates a photographing part. 10 designates a display control part. 11 designates an application part. 12 designates a display. 30 designates a portable telephone. 33 designates a first display part. 34 designates a camera. 35 designates a second display part. 36 designates an operating key. 41 designates a photographing part. 42 designates an operating part. 43 designates a display part. 44 designates a communication part. 45 designates an audio processing part. 46 designates a storing part. 47 designates a control processing part. 51 designates a character recognizing part. 52 designates a character using part. 61 designates a temporarily storing part. 62 designates a storing part. 63 designates an output part. 64 designates a type deciding part.

BEST MODE FOR CARRYING OUT THE INVENTION

Now, referring to the drawings, embodiments of the present invention will be described below.

First Embodiment

FIG. 1 is a block diagram showing the structure of a portable terminal device having a character recognition processing device according to a first embodiment of the present invention. In this embodiment, a structural example that the character recognition processing device 2 is mounted on the portable terminal device 1 is described.

The character recognition processing device 2 of this embodiment includes an image fetching part 3, a cursor control part 4, a layout analyzing part 5, a character cutting part 6, a character recognizing part 7 and a format output part 8. These component elements are realized by the operation of a software program, the combination of software and hardware or an exclusive hardware in a control processing part including a processor and a memory or the like.

The portable terminal device 1 includes a photographing part 9 composed of, for instance, a CCD camera, a display control part 10 and an application part 11 in addition to the character recognition processing device 2. The photographing part 9 photographs an object whose character is to be recognized and fetches the object as photographed data to input the photographed data to an image fetching part 3 of the character recognition processing device 2. The image fetching part 3 corresponds to an image fetching unit to convert the inputted photographed data to image data of a prescribed format and input the image data to the display control part 10. The cursor control part 4 corresponds to a cursor information output unit to input cursor position information related to a cursor that functions as a character frame for recognizing a character to the display control part 10. The display control part 10 converts the inputted image data and the cursor position information to display data, further processes the display data to a format suitable for a display 12 composed of a liquid crystal display element and outputs the processed display data to display information on the display 12.

The layout analyzing part 5 corresponds to a layout analyzing unit to receive the image data of the prescribed format from the image fetching part 3 and the cursor position information from the cursor control part 4 upon recognizing the character. Then, the layout analyzing part 5 collates the cursor position information with the image data to analyze a layout. The character cutting part 6 corresponds to a character cutting unit to cut and extract the image data for a character unit on the basis of the analyzed result of the layout. The character recognizing part 7 corresponds to a character recognizing unit to recognize the cut image data for a character unit and convert the image data to character data. The format output part 8 converts the character data recognized in the character recognizing part 7 to a proper format. The application part 11 uses the character data converted to the format in the format output part 8 as data for an application and inputs the data to the display control part 10 as required to display the data on the display 12.

Figure 2:
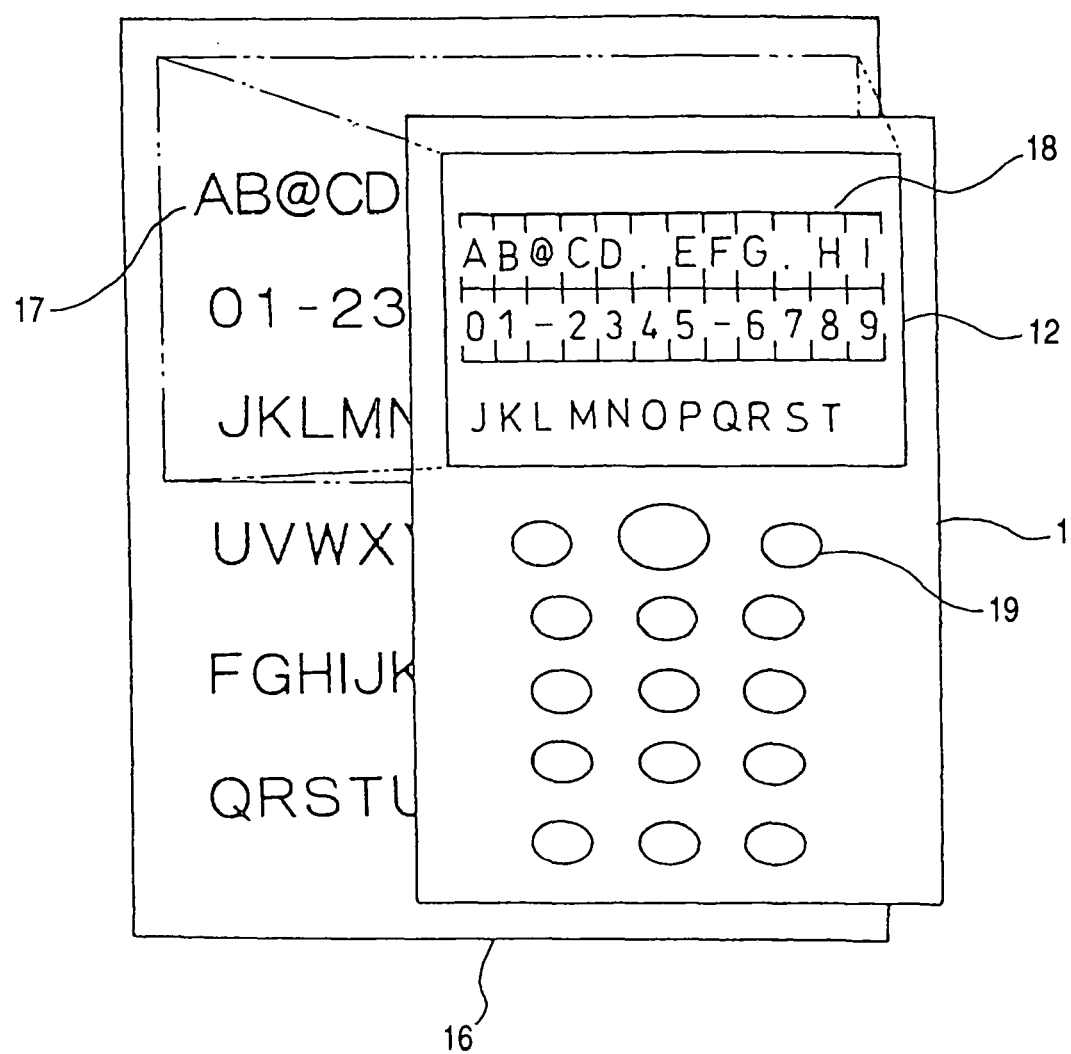
FIG. 2 is an explanatory view of an operation during a character recognizing process in the character recognition processing device according to the first embodiment of the present invention showing a state that a character string as an object to be recognized is photographed.

Now, referring to FIG. 2, an operation of the character recognition processing device of the first embodiment will be described below. FIG. 2 is an explanatory view of an operation at the time of a character recognizing process according to the first embodiment and shows a state that a character string as an object to be recognized is photographed.

A character string 17 as an object to be recognized in an object 16 whose character is to be recognized is photographed by the photographing part 9 of the portable terminal device 1 to recognize the character. When the photographed character string 17 as the object to be recognized is displayed on the display 12, a cursor 18 as a character frame for recognizing a character is displayed together with the character string 17 as the object to be recognized. While a user adjusts a photographing position, the user sets the character string 17 as the object to be recognized to the cursor 18, the user operates an operating button 19 to photograph a still image under this state.

The photographed still image of the character string 17 as the object to be recognized is converted to the image data of a determined format and fetched in the image fetching part 3 and the image data is supplied to the layout analyzing part 5. The layout analyzing part 5 receives the cursor position information from the cursor control part 4 to collate the cursor position information with the image data of a character image. In such a way, the layout analyzing part 5 can precisely analyze the arrangement information of lines and characters of the character string 17 as the object to be recognized by using the cursor position information. The character cutting part 6 cuts the image data for a character unit. The image data extracted for a character unit is converted to the character data to recognize the character.

As described above, in the character recognition processing device of the first embodiment, when the character of the character string 17 as the object to be recognized of the object 16 whose character is to be recognized is recognized, the image of the character string 17 as the object to be recognized and the cursor 18 as the character frame for recognizing the character are displayed together on the display 12. While the user sets the cursor 18 to the character string 17 as the object to be recognized, the still image is photographed. Thus, the image data of the photographed character image is fetched together with the cursor position information. Thus, in the layout analyzing part 5, the arrangement information of the lines or the characters can be easily and precisely analyzed by using the cursor position information so that a rate of recognition and a recognition speed can be improved in recognizing the character.

Second Embodiment

Figure 3:
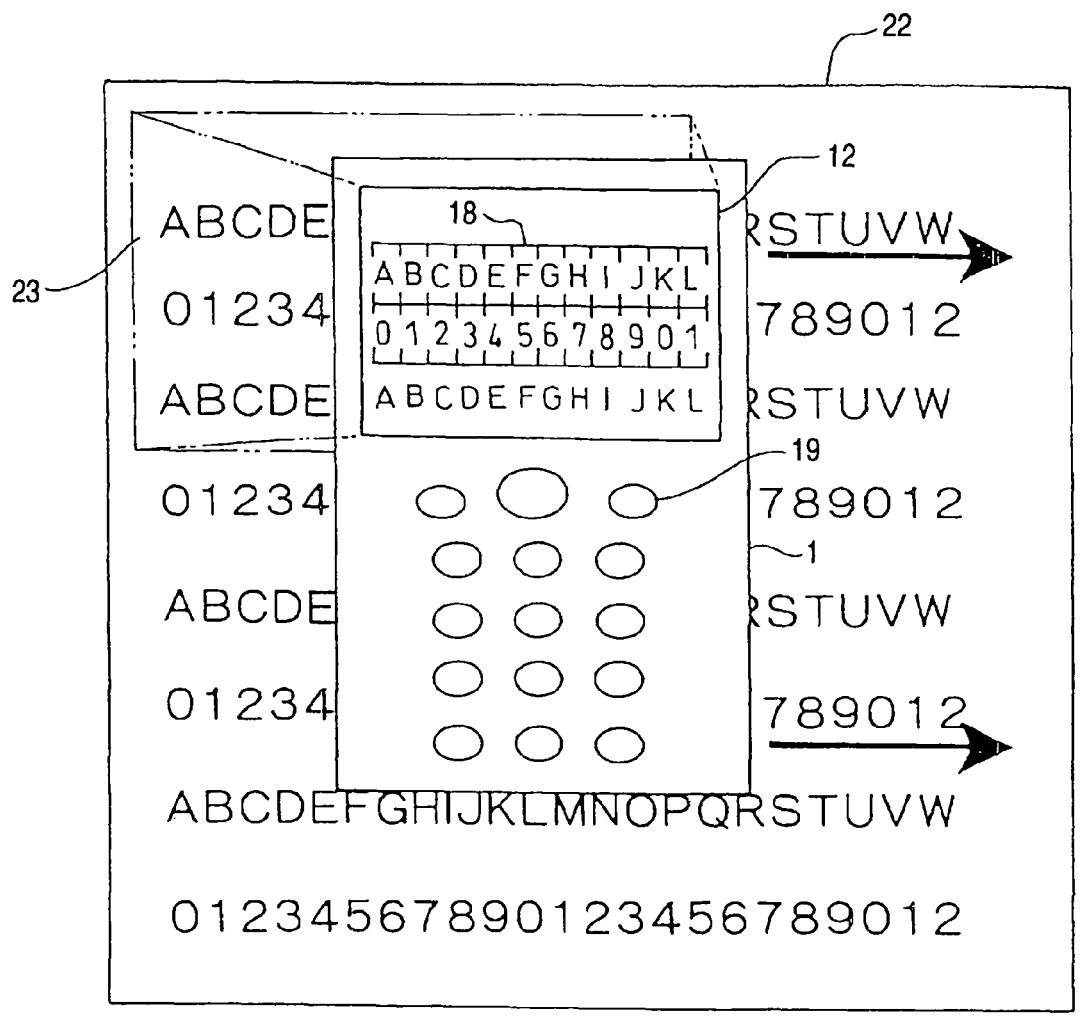
FIG. 3 is an explanatory view of an operation during a character recognizing process in the character recognition processing device according to a second embodiment of the present invention showing a state that a character string as an object to be recognized is photographed.
Figure 4:
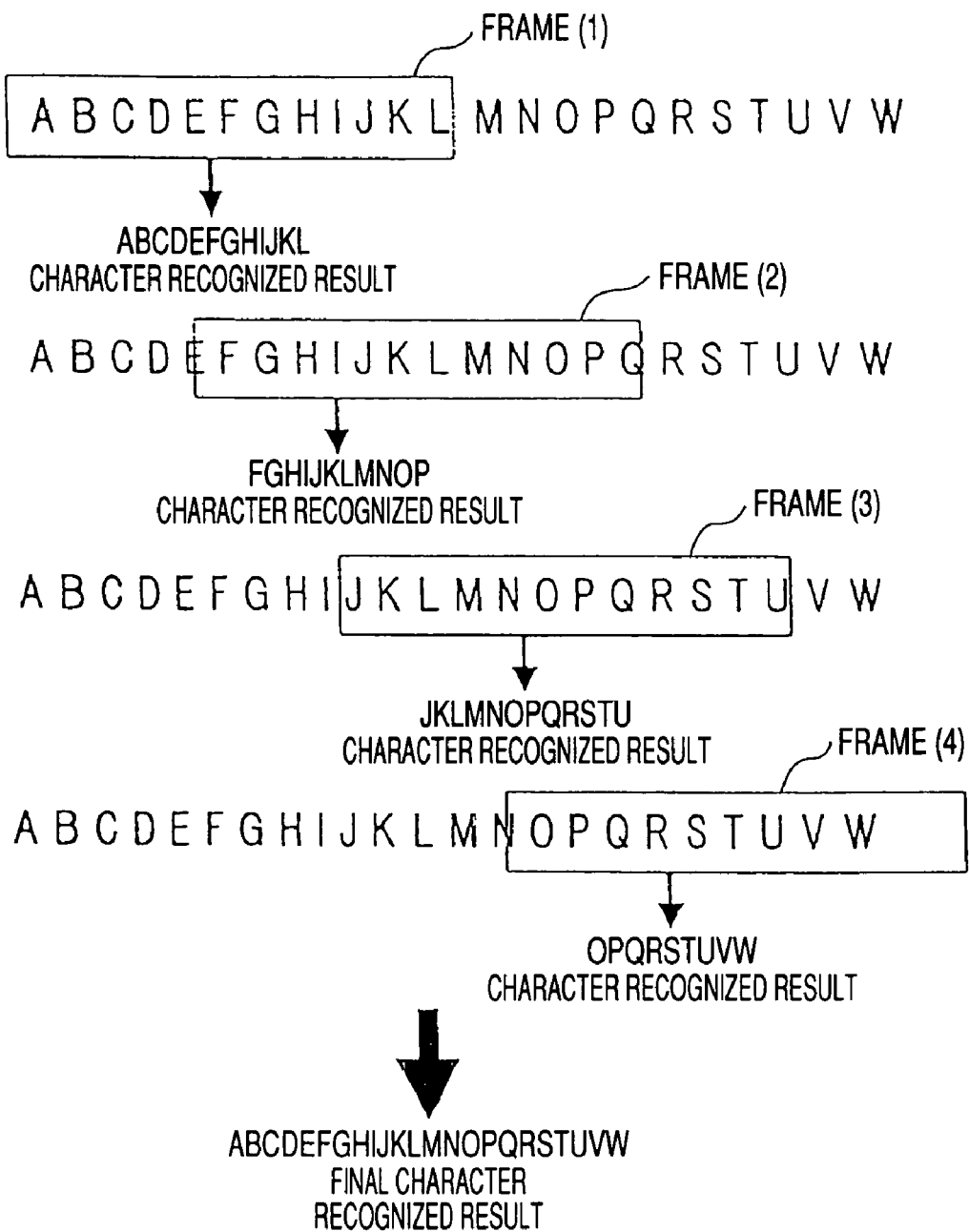
FIG. 4 is an explanatory view of an operation during a character recognizing process in the character recognition processing device according to the second embodiment of the present invention showing a state of a character recognizing process relative to a character string as an object to be recognized that is divided into a plurality of parts.

Now, an operation of a character recognition processing device according to a second embodiment of the present invention will be described by referring to FIGS. 3 and 4. FIGS. 3 and 4 are explanatory views of an operation during a character recognizing process according to the second embodiment. FIG. 3 shows a state that a character string as an object to be recognized is photographed. FIG. 4 shows a manner of the character recognizing process relative to the character string as the object to be recognized that is divided into a plurality of parts. Since the structure of the character recognition processing device is the same as that of the first embodiment, FIG. 1 is applied thereto.

In the second embodiment, a character string 23 as an object to be recognized in an object 22 whose character is to be recognized is photographed by a photographing part 9 of a portable terminal device 1 to recognize a character in the same manner as that of the first embodiment. In this case, when the range of the character string 23 as the object to be recognized is wide so that an image cannot be fetched at a time, a below-described operation is carried out.

When the photographed character string 23 as the object to be recognized is displayed on a display 12, a cursor 18 as a character frame for recognizing a character is displayed together with the character string 23 as the object to be recognized. While a user adjusts a photographing position, the user sets a part of the position of a start end of the character string 23 as the object to be recognized (a part of a left end in an example shown in FIG. 3) to the cursor 18. Under this state, an operating button 19 is operated to start a photographing operation of a continuous still image. After the photographing operation is started, while the user fixes the moving direction of the portable terminal device 1, the user slides the portable terminal device to a direction opposite to the position of the start end upon starting a photographing operation (a right direction in the example shown in FIG. 3) in parallel with the character string 23 as the object to be recognized so as to be directed to a writing direction of a character. Thus, when the character string 23 as the object to be recognized is displayed on the display 12 so as to accommodate the character string 23 in the cursor 18 up to a position of a finish end (a position of a right end in the example shown in FIG. 3) of the character string 23 as the object to be recognized, the photographing operation of the continuous still image is finished. At this time, the user keeps pressing down the operating button 19, for instance, during the photographing operation of the continuous still image.

The continuous still image of the photographed character string 23 as the object to be recognized is divided into a plurality of image data and fetched in an image fetching part 3 as shown in FIG. 4. In this case, a character image of one line is divided into still images of some frames (1) to (4) and the still images are extracted from all of character images and converted to the image data of a determined format. The image data is delivered to a layout analyzing part 5.

Further, in the layout analyzing part 5, cursor position information is received from a cursor control part 4 to collate the cursor position information with the image data of the character image. In this case, characters may not be possibly respectively accommodated in the character frame of the cursor with respect to the character images of each frame used for analyzing a layout. Accordingly, the cursor position information can be used without a problem to analyze arrangement information relative to a "line". However, the cursor position information may not be used for analyzing the arrangement information for each character. In this case, the cursor position information may be shifted to the moving direction of the continuous still image to analyze the arrangement information of each character. As described above, in the layout analyzing part 5, even when the character string 23 as the object to be recognized is long, the arrangement information of the character string 23 as the object to be recognized can be precisely analyzed by employing the cursor position information. In this embodiment, the arrangement information of the lines can be precisely analyzed.

Then, in a character cutting part 6, the image data is cut for a character unit. In a character recognizing part 7, the extracted image data for a character unit is converted to character data to recognize a character. In this case, as the recognized result of the character, "ABCDEFGHIJKL" is obtained in the frame (1). In the frame (2), "FGHIJKLMNOP" is obtained. In the frame (3), "JKLMNOPQRSTU" is obtained. In the frame (4), "OPQRSTUVW" is obtained. In the character recognizing part 7, the recognized results of the characters respectively for the frames are synthesized so that "ABCDEFGHIJKLMNOPQRSTUVW" is obtained as a final recognized result of the characters.

In the second embodiment, for the purpose of simplicity, such an explanation that the character image for one line is collated with the cursor to perform a series of character recognizing processes is described. However, as shown in FIG. 3, when the cursor 18 is provided for two lines, a series of character recognizing processes can be carried out for the two lines at the same.

As described above, in the character recognition processing device of the second embodiment, when the characters of the character string 23 as the object to be recognized of the object 22 whose character is to be recognized are recognized, the cursor 18 as the character frame for recognizing the character is displayed on the display 12 together with the image of the character string 17 as the object to be recognized. Then, the user moves the portable terminal device 1 to photograph the continuous still image. Then, the photographed character image is divided into some still images and the image data of each frame is fetched together with the cursor position information. Thus, in the layout analyzing part 5, the arrangement information of the lines can be easily and accurately analyzed by using the cursor position information, and a rate of recognition and recognition speed can be improved in recognizing a character.

In the above-described second embodiment, when the continuous still image photographing is carried out to obtain a plurality of image data, the portable terminal device is moved on the character string as the object to be recognized by keeping the operating button 19 of the portable terminal device 1 pressed down. However, the present invention is not limited thereto. For instance, while the user moves the main body of the portable terminal device 1 to move a photographing range, the user may press down the operating button 19 each time to intermittently obtain the plurality of image data. The user may also obtain the image data of a continuous wide range as the image of the character string as the object to be recognized.

Further, the layout analyzing part 5 may analyze the layout for each character image of a plurality of character images (still images) fetched by the image fetching part 3. The layout analyzing part may temporarily connect the plurality of character images to one character image, and then, analyze the layout.

As described above, in this embodiment, even when the number of pixels of the image data for recognizing the character is not increased, the character can be highly accurately recognized by using the cursor position information. Accordingly, a specification of high performance, that the number of pixels of the photographing part 9 is increased, is not required and a specification required for the device can be reduced. Further, the throughput of the data in the device can be reduced, so that a specification necessary for the device forming a system such as a CPU, a DSP, a memory or the like can be reduced. Accordingly the degree of a specification of each part of the device can be reduced and a low consumed electric power and a low cost can be realized.

Third Embodiment

Now, one example of a structure and an operation when a character recognition processing device is mounted on a portable telephone as a third embodiment will be described below.

Figure 5:
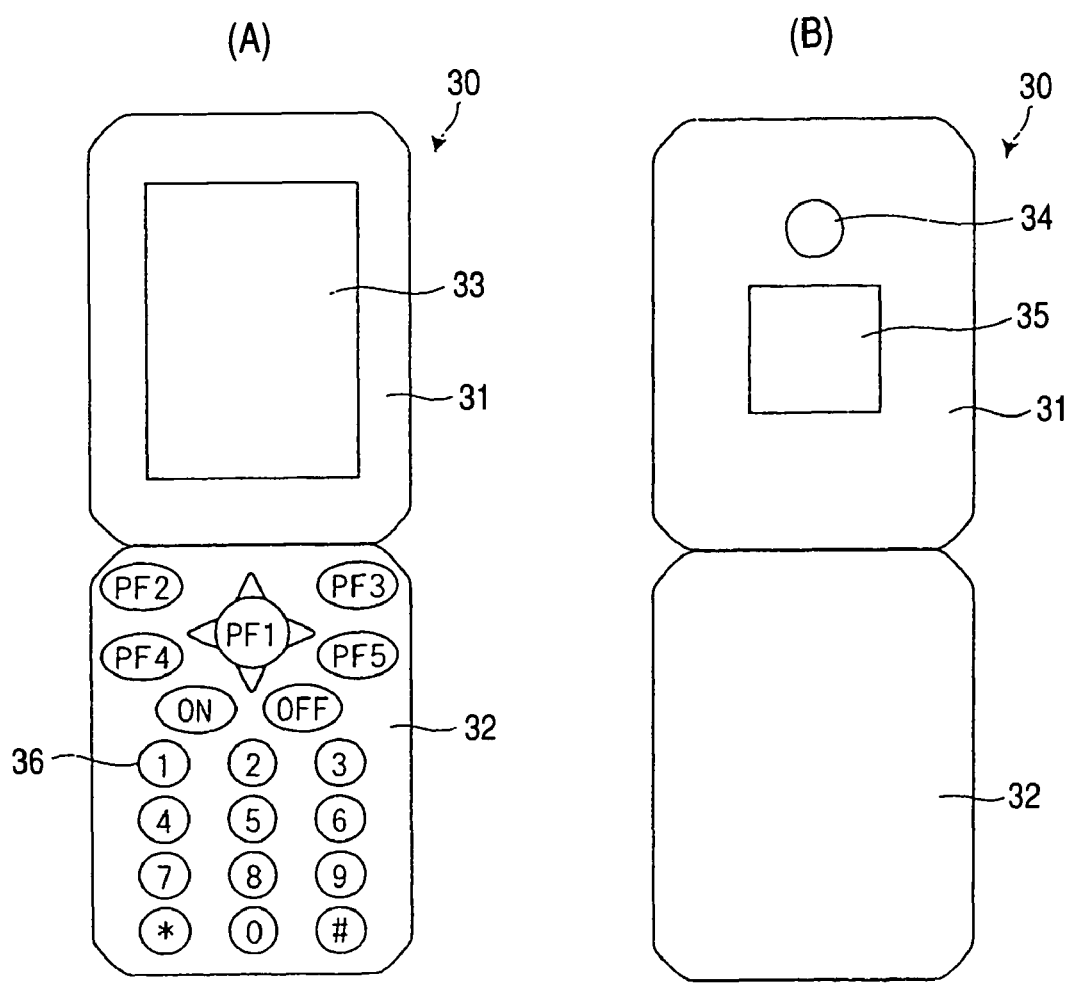
FIG. 5 shows views showing the structure of an external appearance of a portable telephone according to a third embodiment of the present invention, FIG. 5(A) being a front view and FIG. 5(B) being a rear view.

FIG. 5 is a view showing the structure of an external appearance of a portable telephone according to the third embodiment of the present invention. FIG. 5(A) is a front view and FIG. 5(B) is a rear view. The portable telephone 30 of this embodiment includes a first casing 31 and a second casing 32. On a front surface side of the first casing 31, that is, on a surface that mainly faces a user when the user opens the first casing 31 and the second casing 32 and holds them, a first display part 33 composed of a liquid crystal display element is provided. Further, in a rear surface side opposite to the front surface of the first casing 31, a camera 34 as a photographing part and a second display part 35 composed of a liquid crystal display element are provided.

On the front surface side of the second casing 32, an operating key 36 as an operating part having a plurality of key buttons such as an on-hook/off-hook key, a numeric character key, a function key or the like is disposed. Various kinds of functions are assigned to the function keys PF1 to PF5 depending on operation modes or display screens of the device.

Figure 6:
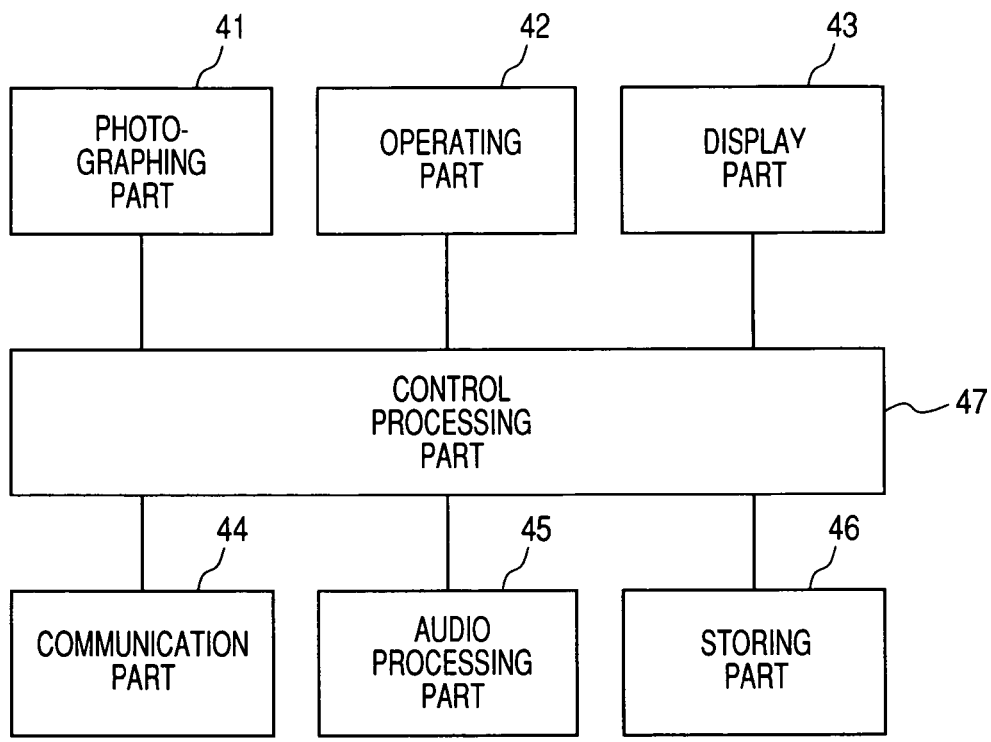
FIG. 6 is a block diagram showing the structure of the portable telephone according to the third embodiment.

FIG. 6 is a block diagram showing the structure of the portable telephone according to the third embodiment. The portable telephone includes a photographing part 41 having a function of a photographing unit for photographing the image of an object whose character is to be recognized, an operating part 42 for performing an operation and input by a user, a display part 43 having functions of a character frame display unit and a recognized character display unit for displaying various kinds of information such as character recognized results, a communication part 44 for performing a radio communication with a base station of a mobile communication system, an audio processing part 45 for performing an audio process of an audio speech or a call receiving sound, a storing part 46 having a function of a recognized character storing unit for storing various kinds of information and a control processing part 47 for carrying out a character recognizing operation, an application process such as the use of recognized character data or controlling respective parts.

When the audio communication is performed in the portable telephone, a speaking voice is inputted, transmitted/received and outputted by the communication part 44, the audio processing part 45 and the control processing part 47. When a message such as an electronic mail is transmitted or received or various kinds of information are obtained by accessing a network such as an internet, character data is inputted and information such as the character data or image data is transmitted and received and displayed by the operating part 42, the display part 43, the communication part 44 and the control processing part 47. When the image is photographed, an object to be photographed is photographed to obtain the image data of a photographed image by the photographing part 41 and the control processing part 47. The storing part 46 stores various kinds of information such as telephone directory registered information including the telephone number or the mail address of a communication mate, the character data such as an electronic mail, the image data such as the photographed image, audio data such as a call receiving sound.

Figure 7:
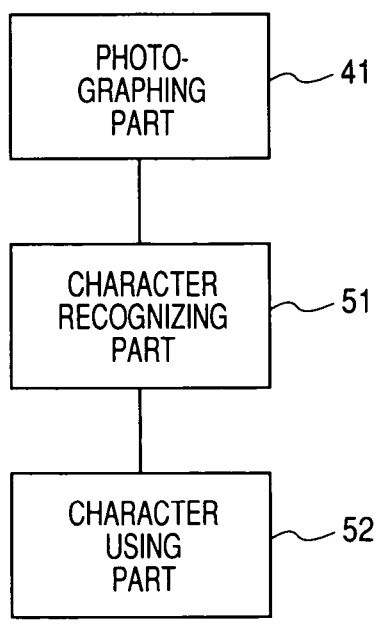
FIG. 7 is a block diagram showing a functional structure related to a character recognizing process in the portable telephone according to the third embodiment.

FIG. 7 is a block diagram showing a functional structure related to a character recognizing process in the portable telephone according to the third embodiment. In the third embodiment, a photographing part 41 and a character recognizing part 51 similar to those of the first and second embodiments are provided. Further, a character using part 52 is also provided. The character using part 52 has a function of a recognized character utilizing unit for using character data as a recognized result in the function of each part is also provided. The character recognizing part 51 and the character using part 52 are realized by hardware including a processor and a memory and a software program operating by using them.

Figure 8:
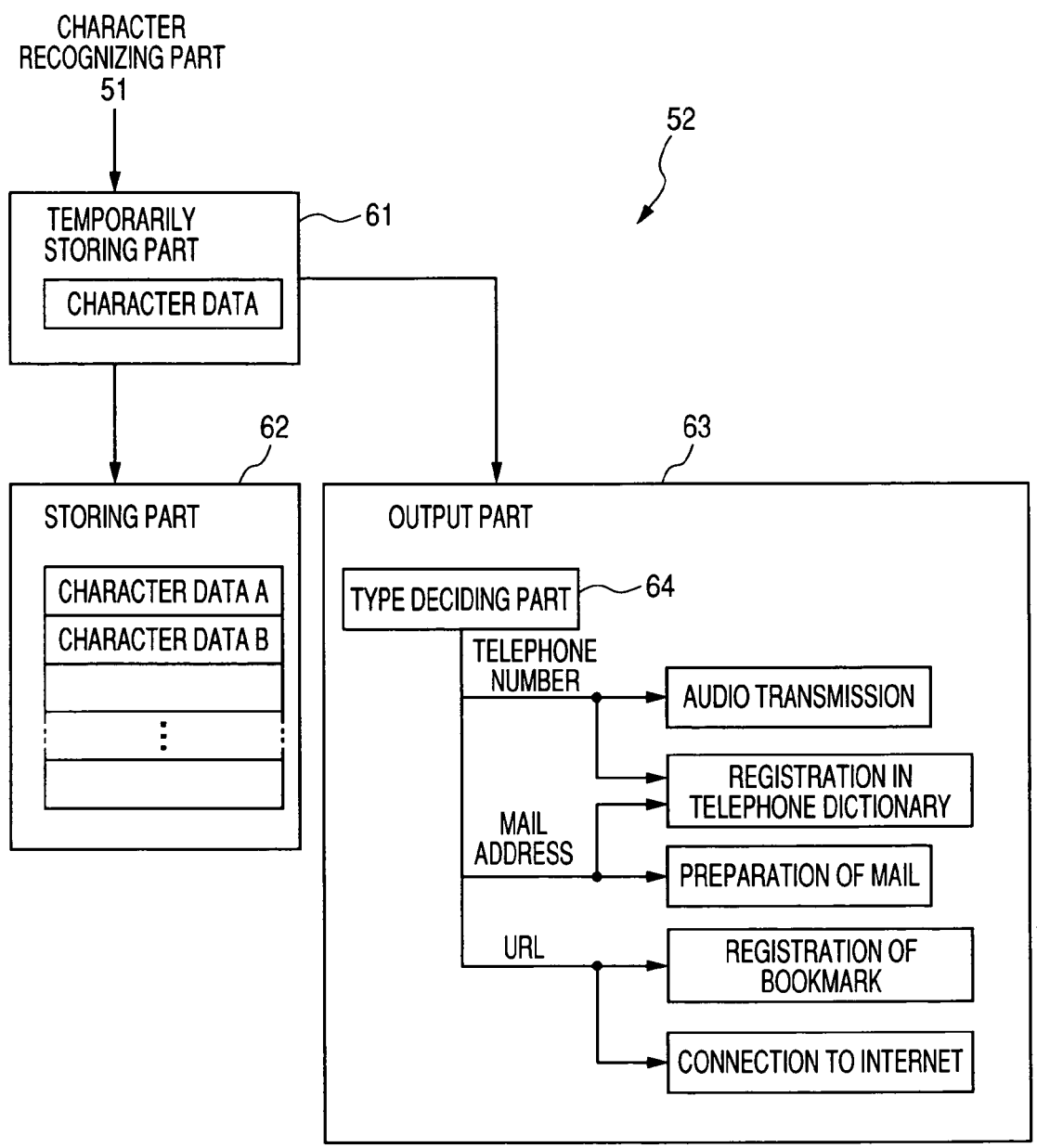
FIG. 8 is an explanatory view showing a functional structure of a character using part in the structure shown in FIG. 7.

FIG. 8 is an explanatory view showing a functional structure of the character using part in the structure shown in FIG. 7. The character using part 52 includes a temporarily storing part 61, a storing part 62 and an output part 63. The temporarily storing part 61 is a recognized character storing unit to temporarily store the character data after the character recognizing process. The storing part 62 is a recognized character storing unit and has a plurality of storing areas as a recognized character storing area to respectively store a plurality of character data. The output part 63 has a type deciding part 64 for deciding the type of the character data to perform an output operation corresponding to the type of the character data of a recognized result. When the character data obtained by recognizing a character is a telephone number, an operation related to an audio calling to the telephone number or a registration in a telephone directory as a database is carried out. When the character data is a mail address, an operation related to a preparation of a mail to the mail address or the registration in the telephone directory is carried out. When the character data is a URL (Uniform Resource Locator), an operation related to an internet connection for accessing the URL or a registration in a book mark as a database is carried out.

Figure 9:
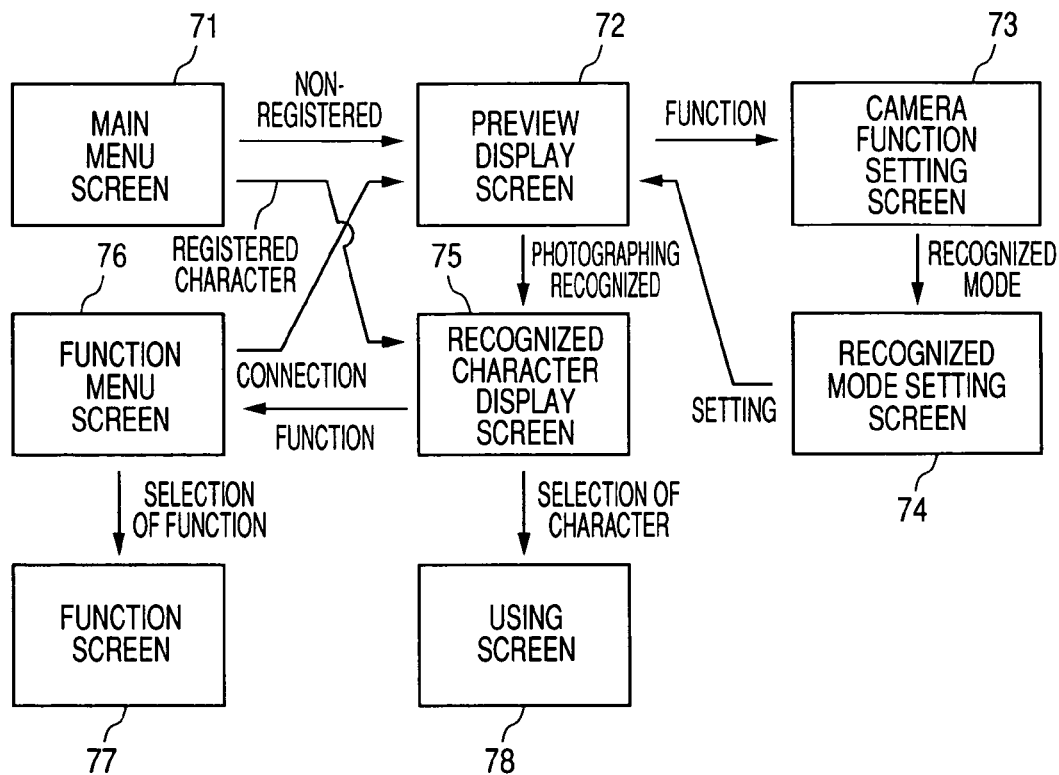
FIG. 9 is an explanatory view showing a flow of all of processes related to a character recognition and the use of characters in the third embodiment.
Figure 10:
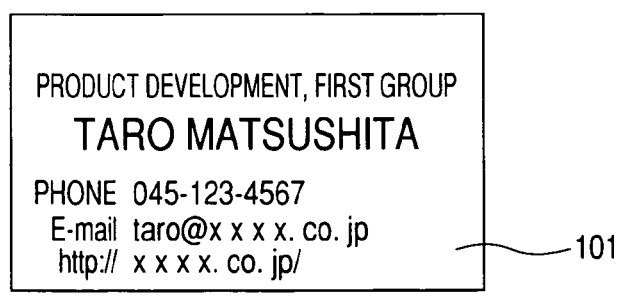
FIG. 10 is a diagram showing one example of an object whose character is to be recognized.

Now, a specific example of an operation concerning the recognition of the character and the use of the character in the third embodiment will be described below. FIG. 9 is an explanatory view showing the flow of an entire process of the recognition of the character and the use of the character. FIG. 9 shows the transition of each of operating states on a display screen displayed on the display part 43 as a center. Here, a case is described in which characters written on a card 101 as the object whose character is to be recognized as shown in FIG. 10 are photographed as objects to be recognized and the characters are recognized by an OCR (Optical Character Recognition) function mounted on the portable telephone.

Figure 11:
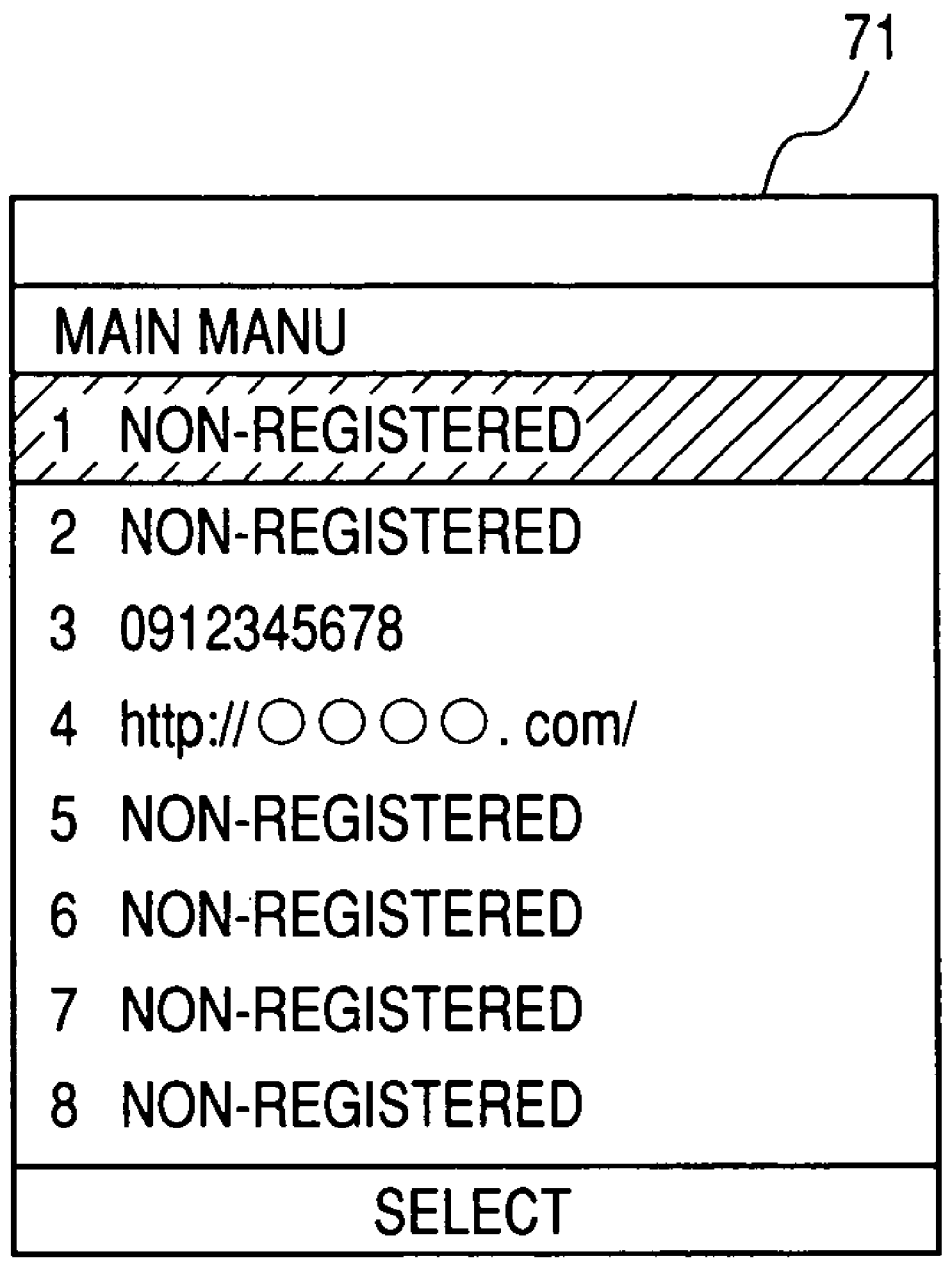
FIG. 11 is a diagram showing one example of a main menu screen of an OCR function in the third embodiment.

When the OCR function of the portable telephone is activated, a main menu screen 71 corresponding to an initial screen is displayed. FIG. 11 shows one example of the main menu screen 71. On this main menu 71, the list of the registered contents of the plurality of character data is displayed. In this embodiment, a plurality (for instance, 20) of character data of character strings to be recognized can be registered. Here, when the user selects a column of a "non-registered" to focus it (shown by oblique lines in the drawing) by a highlight display or the like and presses a "select" button assigned to the function key PF1, the photographing part 41 is activated to photograph the image of a new character string as an object to be recognized to become a waiting state for photographing by a camera. Thus, a preview display screen 72 is displayed. When a focused position is moved to switch an object to be selected, a cross key assigned to the outer peripheral part of the function key PF1 is operated.

FIG. 12(A) shows one example of the preview display screen 72. On the preview display screen 72, a character image 81 as an object to be recognized that is photographed by the photographing part 41 is displayed. On the character image 81, a character frame 82 for recognizing a character showing a character recognizing area is superimposed and displayed. When the user views the character image 81 and adjusts a photographing range so that the character string as the object to be recognized is accommodated in the character frame 82 for recognizing the character and presses down a "photographing" button assigned to the function key PF1, the character image 81 is photographed. Further, a series of character recognizing processes described in the first embodiment such as the analysis of the layout of the character string as the object to be recognized, cutting of the character, the recognition of the character or the like are carried out by the character recognizing part 51.

Further, when the user presses down a "function" button assigned to the function key PF3 in the preview display screen 72 shown in FIG. 12(A), a mode shifts to a function setting mode of the photographing part 41 to display a camera function setting screen 73. FIG. 12(B) shows one example of the camera function setting screen 73. In the camera function setting screen 73, any of a recognizing mode, a brightness adjustment and a photo-light (photographing light) can be selected as a target to be set. Here, when the user selects a column of the "recognizing mode" to focus it and presses down the "select" button assigned to the function key PF1, a recognizing mode setting screen 74 is displayed.

FIG. 12(C) shows one example of the recognizing mode setting screen 74. In the recognizing mode setting screen 74, when any of an automatic mode, a URL mode, a mail address mode and a telephone number mode is selected as the recognizing mode, a character recognizing process specified by the selected mode is carried out for all the character strings of the photographed character image. When a free mode is selected, the character is recognized relative to an arbitrary character string as an object and all the character strings that can be recognized are outputted as recognized character data. When the automatic mode is selected, the character recognizing part 51 automatically decides a suitable recognizing mode depending on the contents of the character image 81 from among the four modes to recognize the character under the suitable recognizing mode. Here, when the user selects the recognizing mode to focus it and presses down the "select" button assigned to the function key PF1, the screen returns to the preview display screen 72. In the above-described operation, the character recognizing process specified by the selected mode is carried out for all the character strings of the photographed character image. However, when any of the automatic mode, the URL mode, the mail address mode and the telephone number mode is selected, only the character string corresponding to the URL or the like may be outputted as the recognized character data.

When the photographing and character recognizing processes are completed from the state of the preview display screen 72, a recognized character display screen 75 is displayed. FIG. 13(A) shows one example of the recognized character display screen 75. In the recognized character display screen 75, the character data of the character string as a recognized result is displayed. Here, when the recognized character string includes the telephone number, the mail address and the URL, an anchor display is carried out in which the above-described items are respectively underlined to focus a selected character string. In this embodiment, the recognized character string is analyzed to identify the telephone number, the mail address and the URL. The telephone number, the mail address and the URL can be individually selected and used in accordance with the type of the character string.

To identify the telephone number, the mail address and the URL, for instance, a below-described deciding method is used.

(1) Telephone Number

When there is a numeric character having 10 or more figures that starts from 0

(2) Mail Address

When there is a character including "@"

(3) URL

When there is a character starting from "http://" or "https://"

In the main menu screen 71, when the user selects a column of a registered character string to focus it and presses down the "select" button assigned to the function key PF1, the recognized character display screen 75 is displayed to display the character data of the character strings recognized and stored in the past.

In the recognized character display screen 75, when the user presses down the "function" button assigned to the function key PF3, a function menu display screen 76 is displayed. FIG. 13(B) shows one example of the function menu display screen 76. In the function menu display screen 76, any of connecting, editing, copying, storing, newly registering in a telephone directory, additionally registering in a telephone directory and registering a book mark can be selected.

When a long character string that cannot be photographed once is continuously photographed to connect recognized results together to one, a function of "connecting" is selected in the function menu display screen 76. When the user selects a column of "connecting" to focus it and presses down the "select" button assigned to the function key PF1, the preview display screen 72 is displayed again so that the character string can be photographed. Then, when the photographing and character recognizing processes of the character string as the object to be recognized are completed subsequently to the previous time, the preview display screen is switched to the recognized character display screen 75. Then, the character string recognized at this time is additionally displayed. In recognizing the character, the character may be recognized for a plurality of images or after the plurality of images are connected together to one image, the character may be recognized.

In the function menu display screen 76, when the user selects each function except "connecting" and presses down the "select" button assigned to the function key PF1, a function screen 77 corresponding to each function is displayed so that each function can be performed. When "editing" is selected, a text editor is activated to display an editing screen. The user can correct an erroneously recognized character in the editing screen. When "copying" is selected, a copying function is called to display a copying range selecting screen. Thus, the user can copy the character data a range of which is designated and use the copied character data in other character input screen. When "storing" is selected, a storing process of the character data of the recognized character string is carried out. When the storing process is completed, a storing operation completion informing screen such as "stored" is displayed. Thus, the recognized character string obtained by the character recognizing process at this time is stored in the column of the "non-registered" selected in the main menu screen 71.

Further, when "newly registering in a telephone directory" or "additionally registering in a telephone directory" is selected, a telephone directory registering screen is displayed so that the user can register the recognized character strings such as the telephone number, the mail address, a name, or the like in desired columns of the telephone directory. When "registering a book mark" is selected, a book mark registering screen is displayed so that the user can register the recognized character string such as the URL as a book mark.

In the recognized character display screen 75, when the user selects the character string of any of the telephone number, the mail address and the URL, and presses down the "select" button assigned to the function key PF1, a using screen 78 corresponding to the type of each of the character strings is displayed. When the telephone number is selected, as shown in FIG. 13(C), an audio transmitting screen 78*a* is displayed as the using screen. In the audio transmitting screen 78*a*, an audio transmission to the telephone number whose character is recognized can be carried out by a simple operation. When the URL is selected, as shown in FIG. 13(D), an internet connecting screen 78*b* is displayed as the using screen. Thus, an internet connection by the URL whose character is recognized can be carried out by a simple operation. When the mail address is selected, as shown in FIG. 13(E), a mail preparing screen 78*c* is displayed as the using screen. Thus, the preparation of an electronic mail to the mail address whose character is recognized can be carried out by a simple operation.

As described above, in the third embodiment as in the first and second embodiments, the character frame for recognizing the character is displayed on the preview display screen upon photographing the object to be recognized to photograph the character image of the object to be recognized. Thus, the character of the image in the frame is recognized so that a load applied to the character recognizing process can be reduced.

Further, the recognizing mode is selected to perform the character recognizing process in accordance with the type of a preset character as the object to be recognized, so that a character recognizing accuracy can be improved. Further, on the recognized character display screen, the character data of a plurality of types are arranged and displayed as the recognized results. Thus, the character data can be divided for prescribed character units and individually selected, used and stored. Thus, the recognized character data corresponding to the types of the character strings can be easily employed, for instance, the audio transmission in the case of the telephone number, the preparation of the mail in the case of the mail address or the like.

The present invention is not limited to the above-described embodiments and may be put into practice in various ways within a scope without departing its gist.

The present invention is described in detail by referring to the specific embodiments. However, it is to be understood to a person with ordinary skill in the art that various changes or modifications may be applied to the invention without departing the spirit and the scope of the present invention.

This application is based on Japanese Patent Application No. 2002-230312 filed on Aug. 7, 2002 and Japanese Patent Application No. 2003-133171 filed on May 12, 2003 and the contents of them are incorporated herein as references.

INDUSTRIAL APPLICABILITY

As described above, according to the present invention, a character recognition processing device and a character recognition processing method can be provided which can improve a rate of recognition and a recognition speed, can reduce the degree of a specification required for a device forming a photographing device or a system and can decrease consumed electric power and a cost.

The invention claimed is:

1. A character recognition processing device, comprising:
    a photographing unit which photographs a plurality of character images using a continuous photographing operation in which a continuous still image is captured and automatically divided into the plurality of character images, wherein each character image comprises a plurality of characters;
    an image fetching unit, which fetches image data of the plurality of character images as objects to be recognized, the plurality of character images being photographed for recognizing individual characters of the plurality of characters in each character image;
    a cursor information output unit, which outputs cursor position information showing a position of a character frame, wherein the character frame includes vertical marks and horizontal lines to be used for separating each of the individual characters of the plurality of characters in each character image from each other;
a display that simultaneously displays a cursor, which includes the character frame, with the continuous still image at the time of capturing the continuous still image;
a layout analyzing unit, which collates the cursor position information with the fetched image data of the plurality of character images to analyze an arrangement of said individual characters;
a character cutting unit, which extracts said individual characters on the basis of the analyzed result of the layout analyzing unit; and
a character recognizing unit, which recognizes the extracted individual characters and converts the extracted individual characters to character information, wherein
said character frame including vertical marks and horizontal lines is displayed with the continuous still image prior to said character recognizing unit recognizing the individual characters.

2. The character recognition processing device according to claim 1, wherein the image fetching unit fetches the image data of the character images respectively by a prescribed area from all of the character images; and
wherein the layout analyzing unit collates the cursor position information with the fetched image data of each of the plurality of character images separately.

3. The character recognition processing device according to claim 1, wherein the image fetching unit fetches the image data of the character images respectively by a prescribed area from all of the character images; and
wherein the layout analyzing unit collates the cursor position information with the image data in which the plurality of fetched character images are connected together.

4. A portable terminal device having the character recognition processing device according to any one of claims 1 to 3.

5. A portable terminal device, comprising:
a photographing unit, which photographs a plurality of character images using a continuous photographing operation in which a continuous still image is captured and automatically divided into the plurality of character images, wherein each one of the plurality of character images comprises a plurality of characters;
an image fetching unit, which fetches image data of the photographed plurality of character images;
a cursor information output unit, which outputs cursor position information showing a position of a character frame, wherein the character frame includes vertical marks and horizontal lines to be used for separating each of the individual characters of the plurality of characters in each character image;
a display that simultaneously displays a cursor, which includes the character frame, with the continuous still image at the time of capturing the continuous still image;
a layout analyzing unit, which collates the cursor position information with the fetched image data of the plurality of character images to analyze the arrangement of said individual characters;
a character extracting unit, which extracts said individual characters on the basis of the analyzed result of the layout analyzing unit; and
a character recognizing unit, which recognizes the extracted individual characters and converts the extracted individual characters to character information, wherein
said character frame including vertical marks and horizontal lines is displayed with the continuous still image prior to said character recognizing unit recognizing the individual characters.

6. The portable terminal device according to claim 5, further comprising a recognized character display unit which displays, on said display, the character information as a recognized result by the character recognizing unit.

7. The portable terminal device according to claim 6, wherein the recognized character display unit individually selectively displays the character information as the recognized result by a prescribed character unit.

8. The portable terminal device according to claim 5, further comprising a recognized character storing unit which stores the character information as the recognized result obtained by the character recognizing unit.

9. The portable terminal device according to claim 8, wherein the recognized character storing unit stores the character information in a recognized character storing area.

10. The portable terminal device according to claim 8, wherein the recognized character storing unit registers the character information in a data base corresponding to a type of each character information when the type of the character information is any one of a telephone number, a mail address and a URL (Uniform Resource Location).

11. The portable terminal device according to claim 5, further comprising a recognized character utilizing unit which utilizes the character information as the recognized result obtained by the character recognizing unit in accordance with a type of the character information.

12. The portable terminal device according to claim 11, wherein when the type of the character information is a telephone number, the recognized character utilizing unit displays a transmitting screen to the telephone number.

13. The portable telephone terminal device according to claim 11, wherein when the type of the character information is a mail address, the recognized character utilizing unit displays a preparing screen for an electronic mail to the mail address.

14. The portable terminal device according to claim 11, wherein when the type of the character information is a URL (Uniform Resource Locator), the recognized character utilizing unit displays a network connecting screen to the URL.

15. The portable terminal device according to claim 5, wherein before the image fetching unit fetches the image data of the plurality of character images, the image data of the plurality of character images are connected together; and
wherein the character recognizing unit recognizes the extracted individual characters of the image data of the connected character images to convert the image data of the connected character images to the character information.

16. The portable terminal device according to claim 5, wherein the character recognizing unit separately recognizes each of the extracted individual characters.

17. The portable terminal device according to claim 5, wherein the character recognizing unit has a plurality of recognizing modes that each correspond with a type of character information; and
wherein the character recognizing unit carries out a character recognizing process suitable for the corresponding type of character information in accordance with a preset recognizing mode.

18. A character recognition processing method performed by a portable terminal device, comprising the steps of:

photographing, by the portable terminal device, a plurality of character images, each of which comprises a plurality of characters, while simultaneously displaying each respective character image together with a cursor that includes a character frame for recognizing a character, wherein the plurality of character images are photographed using a continuous photographing operation in which a continuous still image is captured and automatically divided into the plurality of character images;

fetching image data of the photographed plurality of character images;

outputting cursor position information showing the position of the character frame, wherein the character frame includes vertical marks and horizontal lines to be used for separating each of the individual characters of the plurality of characters in each character image;

collating the cursor position information with the fetched image data of the plurality of character images to analyze the arrangement of said individual characters;

extracting said individual characters on the basis of the analyzed result of the arrangement of said individual characters; and recognizing the extracted individual characters images as the characters and converting the extracted individual characters to character information, wherein said outputting the character frame including vertical marks and horizontal lines with the continuous still image is performed prior to recognizing the extracted individual character images as characters.

19. A character recognition processing program in which the respective steps defined in claim 18 are executed by a computer running a program, wherein said program is stored within a non-transitory computer readable medium that is accessible by the computer.

* * * * *